US009313706B1

(12) United States Patent
Oroskar et al.

(10) Patent No.: US 9,313,706 B1
(45) Date of Patent: Apr. 12, 2016

(54) PROCESSING PREAMBLE USAGE DATA TO SELECT A HANDOVER TARGET IN A WIRELESS COMMUNICATION SYSTEM

(71) Applicant: Sprint Communications Company L.P., Overland Park, KS (US)

(72) Inventors: Siddharth Oroskar, Overland Park, KS (US); Maulik K. Shah, Overland Park, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 119 days.

(21) Appl. No.: 14/092,342

(22) Filed: Nov. 27, 2013

(51) Int. Cl.
*H04W 4/00* (2009.01)
*H04W 36/06* (2009.01)

(52) U.S. Cl.
CPC ...................................... *H04W 36/06* (2013.01)

(58) Field of Classification Search
CPC .................................................. H04W 36/0072
See application file for complete search history.

(56) References Cited

U.S. PATENT DOCUMENTS

| 8,238,312 | B2 | 8/2012 | Gandham et al. | |
|---|---|---|---|---|
| 8,380,196 | B2* | 2/2013 | Racz et al. | 455/436 |
| 8,554,221 | B2* | 10/2013 | Dalsgaard et al. | 455/436 |
| 2005/0250499 | A1 | 11/2005 | Lee et al. | |
| 2008/0268850 | A1* | 10/2008 | Narasimha et al. | 455/437 |
| 2010/0202402 | A1 | 8/2010 | Dalsgaard et al. | |
| 2011/0039567 | A1* | 2/2011 | Lee et al. | 455/450 |
| 2012/0250644 | A1* | 10/2012 | Sambhwani et al. | 370/329 |
| 2014/0128083 | A1* | 5/2014 | Esch et al. | 455/439 |

FOREIGN PATENT DOCUMENTS

WO          WO 2010013032 A1 *   2/2010

* cited by examiner

*Primary Examiner* — Maharishi Khirodhar

(57) ABSTRACT

A source eNodeB initiates a handover of a user equipment. The source eNodeB receives preamble usage data transferred by a set of neighboring eNodeBs. The source eNodeB processes the preamble usage data to select a target eNodeB from the set of neighboring eNodeBs. The source eNodeB sends a handover request for delivery to the target eNodeB.

20 Claims, 4 Drawing Sheets

PROCESSING PREAMBLE USAGE DATA TO SELECT A HANDOVER TARGET IN A WIRELESS COMMUNICATION SYSTEM

TECHNICAL BACKGROUND

LTE is a fully packetized 4G air interface for cellular communication. An eNodeB is the cell base station of an LTE wireless communication network. A source eNodeB is an eNodeB serving as an LTE access point for a user equipment. User equipment may be a smart phone, tablet, personal computer, or any processing device with an LTE transceiver. A neighbor eNodeB is an eNodeB that sends LTE signals that are received by a user equipment that has a different source eNodeB. A source eNodeB may decide on a handover of a user equipment to a target eNodeB that the source eNodeB selects.

The decision to initiate a handover is made by identifying a neighbor eNodeB that has a stronger signal than the source eNodeB. The source eNodeB delegates to user equipment the measuring of strength of signals sent from neighbors. The source eNodeB accomplishes this delegation of measurement in two steps. First the source eNodeB sends the user equipment a measurement control message. This message has threshold conditions that tell the user equipment when to upload signal strength measurements. The user equipment repeatedly measures the strength of signals sent from source eNodeB and neighbor eNodeBs. When the user equipment detects that a signal strength measurement crosses a threshold condition, the user equipment sends to the source eNodeB a measurement report that bears strength measurements of signals sent from eNodeBs.

The source eNodeB receives and analyzes the measurement report to decide whether to handover the user equipment to another eNodeB. The source eNodeB also analyzes the measurement report to select which neighbor eNodeB should be the target of the handover. It is suboptimal to select a target eNodeB based solely on measurement reports. This is likely to saturate some eNodeBs and underutilize others. For example a well-placed eNodeB with line of sight to many user equipment may be selected too often as the target of a handover. The well-placed eNodeB would become saturated with many user equipment. To help with load balancing a source eNodeB should consider how loaded are neighbor eNodeBs.

There may be several ways and dimensions for measuring how loaded is a neighbor eNodeB. The load on an eNodeB may determine outcomes such as voice quality or handover success. For example during a handover a target eNodeB needs a spare contention-free preamble to assign to the arriving user equipment. If the target eNodeB is saturated and lacks a spare contention-free preamble, then the user equipment must use a contention-based preamble as a fallback tactic. This fallback tactic is slower and less reliable, so the handover is more likely to fail or cause a brief audible aberration. A source eNodeB that ignores the preamble usage of its neighbors might be less able to balance load within the cellular network. This may jeopardize the quality of service of a voice call being handed over to a saturated target eNodeB.

TECHNICAL OVERVIEW

A source eNodeB initiates a handover of a user equipment. The source eNodeB receives preamble usage data transferred by a set of neighboring eNodeBs. The source eNodeB processes the preamble usage data to select a target eNodeB from the set of neighboring eNodeBs. The source eNodeB sends a handover request for delivery to the target eNodeB.

DETAILED DESCRIPTION

Figure 1:
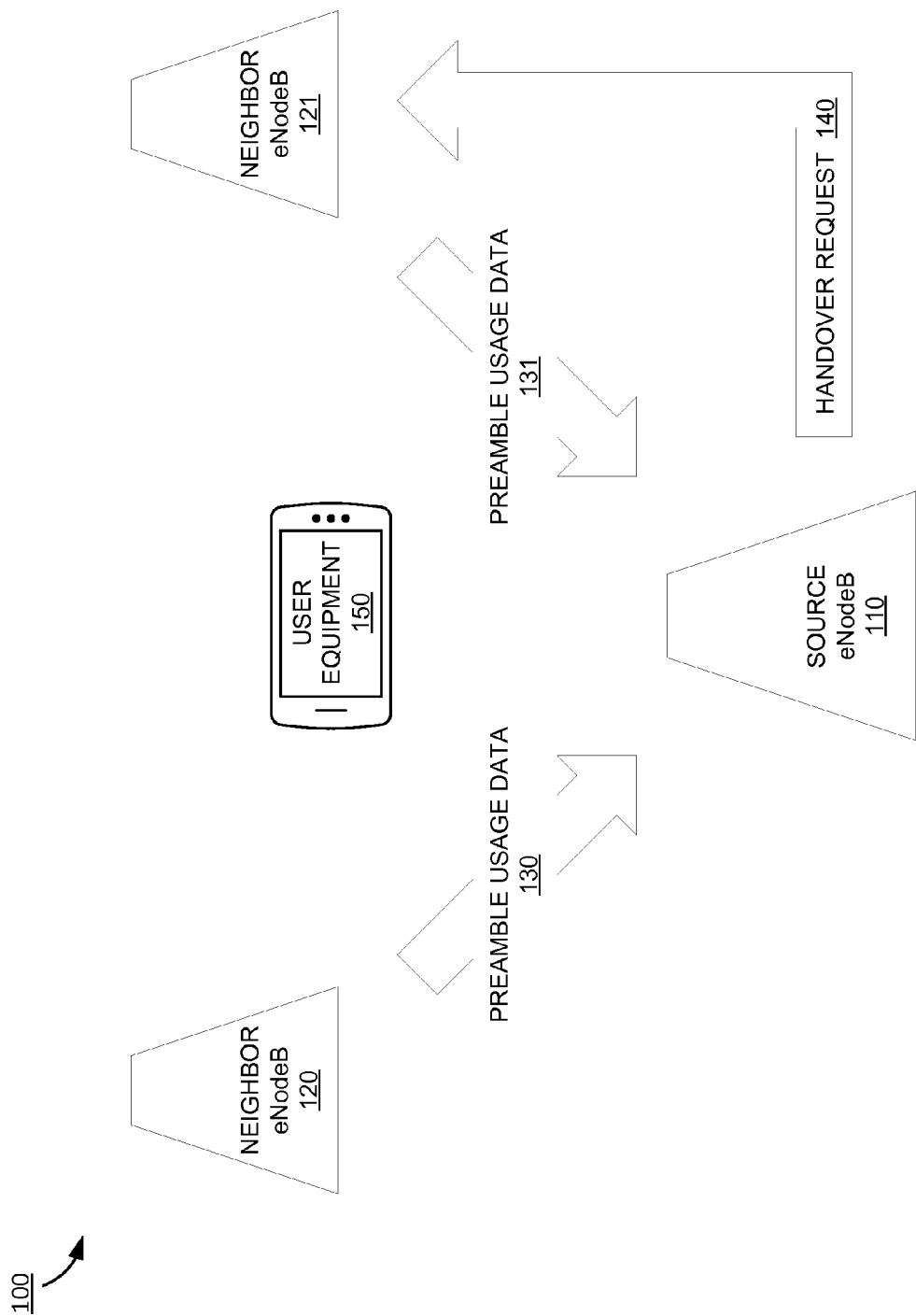
FIG. 1 illustrates a wireless communication system that processes preamble usage data to select a handover target.

FIG. 1 illustrates wireless communication system 100 that processes preamble usage data to select a target eNodeB of a handover. Wireless communication system 100 includes source eNodeB 110, neighbor eNodeBs 120-121, and user equipment 150. Source eNodeB 110 provides wireless network access to a variety of wireless communication devices, including user equipment 150. User equipment 150 may be a smart phone, a tablet, a personal computer, a game console, a hand-held or wearable console, or other software processing device that has an LTE transceiver. FIG. 1 shows the initiation of an inter-eNodeB handover, with separate eNodeBs for eNodeBs 110 and 120-121. Wireless communication system 100 may also perform intra-eNodeB handovers that occur between a pair of sectors of source eNodeB 110.

ENodeBs 110 and 120-121 coordinate with each other, perhaps over X2 or S1 network links that are not shown in FIG. 1. A preamble is used when user equipment 150 is in communication with source eNodeB 110. Although not shown, other preambles may be used when other user equipment is in communication with neighbor eNodeBs 120-121. Neighbor eNodeBs 120-121 monitor preamble usage and share preamble usage data with source eNode 110. Neighbor eNodeBs 120-121 respectively transfer preamble usage data 130-131 to source eNodeB 110. In this example source eNodeB 110 decides on a handover for user equipment 150. Source eNodeB 110 processes preamble usage data 130-131 to select neighbor eNodeB 121 as the target of the handover. Accordingly source eNodeB 110 transfers handover request 140 to neighbor eNodeB 121, thereby initiating a handover.

Figure 2:
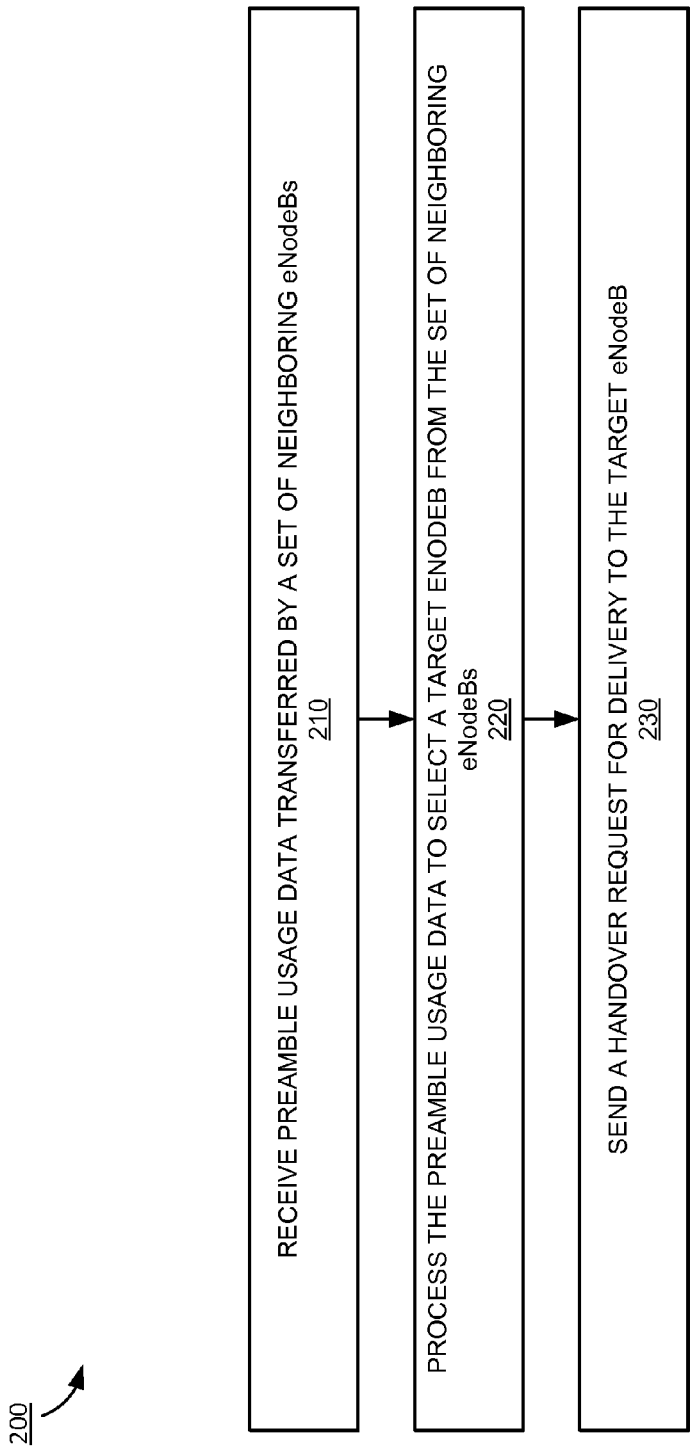
FIG. 2 illustrates the behavior of a wireless communication system that processes preamble usage data to select a handover target.

The states and operations involved with processing preamble usage data to select a handover target in wireless communication system 100 are illustrated as behaviors 200 in FIG. 2. Source base station 110 receives (210) preamble usage data 130-131 respectively transferred by neighbor eNodeBs 120-121. Source base station 110 processes (220) the preamble usage data to select neighbor eNodeB 121 as a target eNodeB. Source base station 110 sends (230) a handover request for delivery to neighbor eNodeB 121.

Because preamble usage may involve operating modes and transmission layers, preamble usage data can be rich with dimensions. A neighbor eNodeB has preambles that it advertises to user equipment for contention based use. Other preambles of the neighbor eNodeB are reserved for contention free use. The neighbor eNodeB may report to a source eNodeB a count of preambles according to some criteria. For example the neighbor eNodeB could report a count of reserved but unallocated contention-free preambles.

The LTE air interface has some logical structures that are sources of preamble usage data. The physical random access channel (PRACH) is an especially suitable source of preamble usage data because it allows transmissions with almost any preamble, whether contention based or contention free. An eNodeB listens on PRACH at specific repeated time intervals. These time intervals offer regular PRACH opportunities for user equipment to transmit a preamble. At each PRACH opportunity the eNodeB does or does not detect a preamble. A neighbor eNodeB may report to a source eNodeB a count of some recent PRACH opportunities with or without a detected preamble. A neighbor eNodeB may report how much time has elapsed since any preamble was detected on PRACH.

Hybrid automatic repeat request (HARQ) is a low level transmission subsystem that may provide preamble usage data. Preamble usage data may be simple, such as a count of HARQ nacks of PRACH or a count of bit errors corrected by HARQ on PRACH during a given time.

Figure 3:
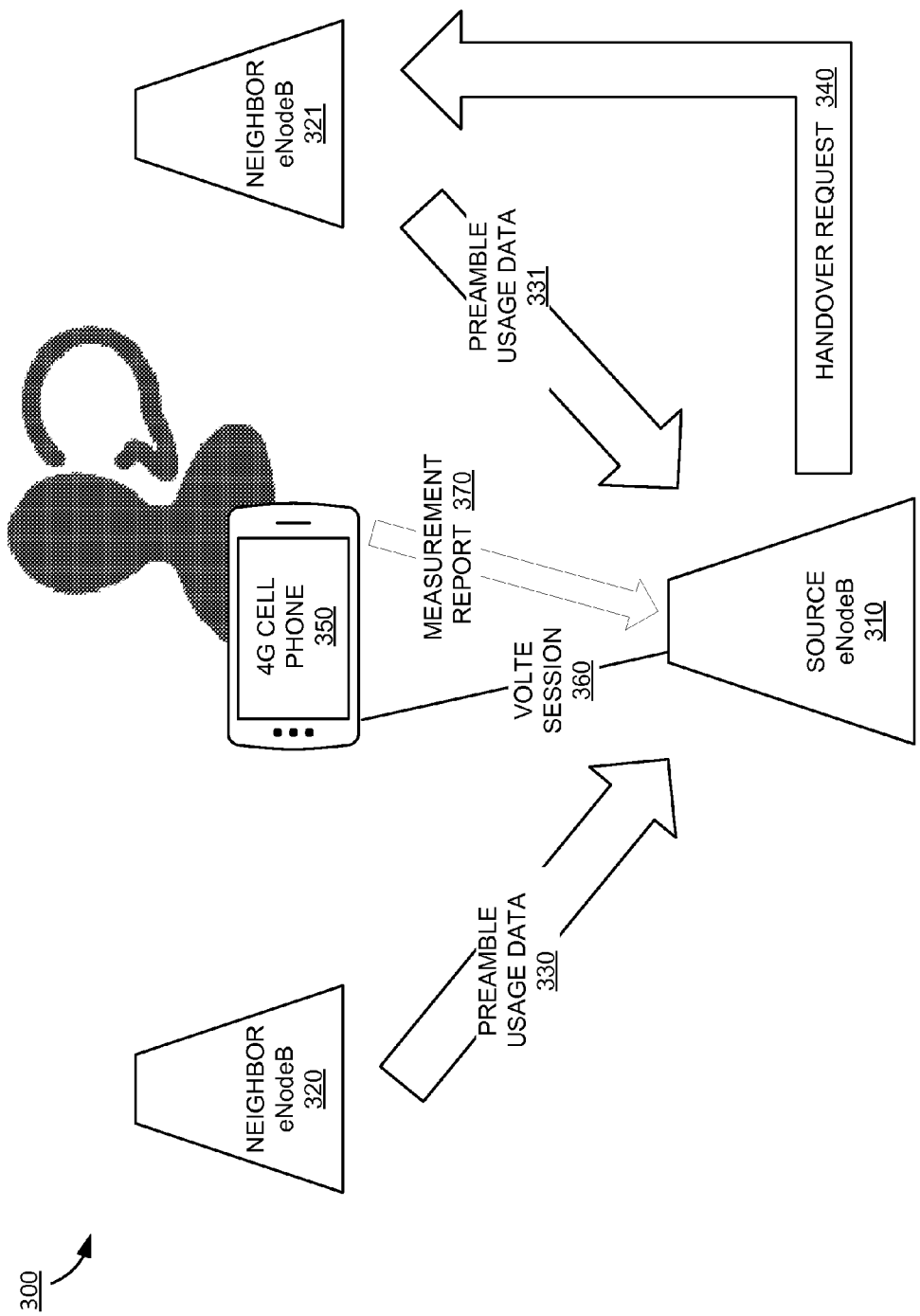
FIG. 3 illustrates a wireless communication system that processes preamble usage data to select a handover target.

FIG. 3 illustrates communication system 300 with an ongoing voice over LTE (VOLTE) session. 4G cell phone 350 participates in VOLTE session 360, for which source eNodeB 310 serves as an LTE access point for the voice call. A voice call is typically given a higher quality of service than data applications get. One way to achieve voice quality is to use a contention free preamble for a more reliable handover, especially during voice calls. Neighbor eNodeBs 320-321 may sometimes keep unallocated contention free preambles in reserve for future voice call handovers. Neighbor eNodeBs 320-321 respectively periodically transfer preamble usage data 330-331 to source eNodeB 310 for use in selecting a target eNodeB for the handover.

4G cell phone 350 may receive signals from source eNodeB 310 and neighbor eNodeBs 320-321. When the characteristics of these eNodeB signals received by 4G cell phone 350 cross some threshold, 4G cell phone 350 sends measurement report 370 to its LTE access point, source eNodeB 310. Source eNodeB 310 evaluates measurement report 370 and decides to handover 4G cell phone 350. Source eNodeB 310 processes preamble usage data 330-331 to select a target eNodeB. Source eNodeB 310 may also process measurement report 370 as a factor in selecting a target eNodeB.

Figure 4:
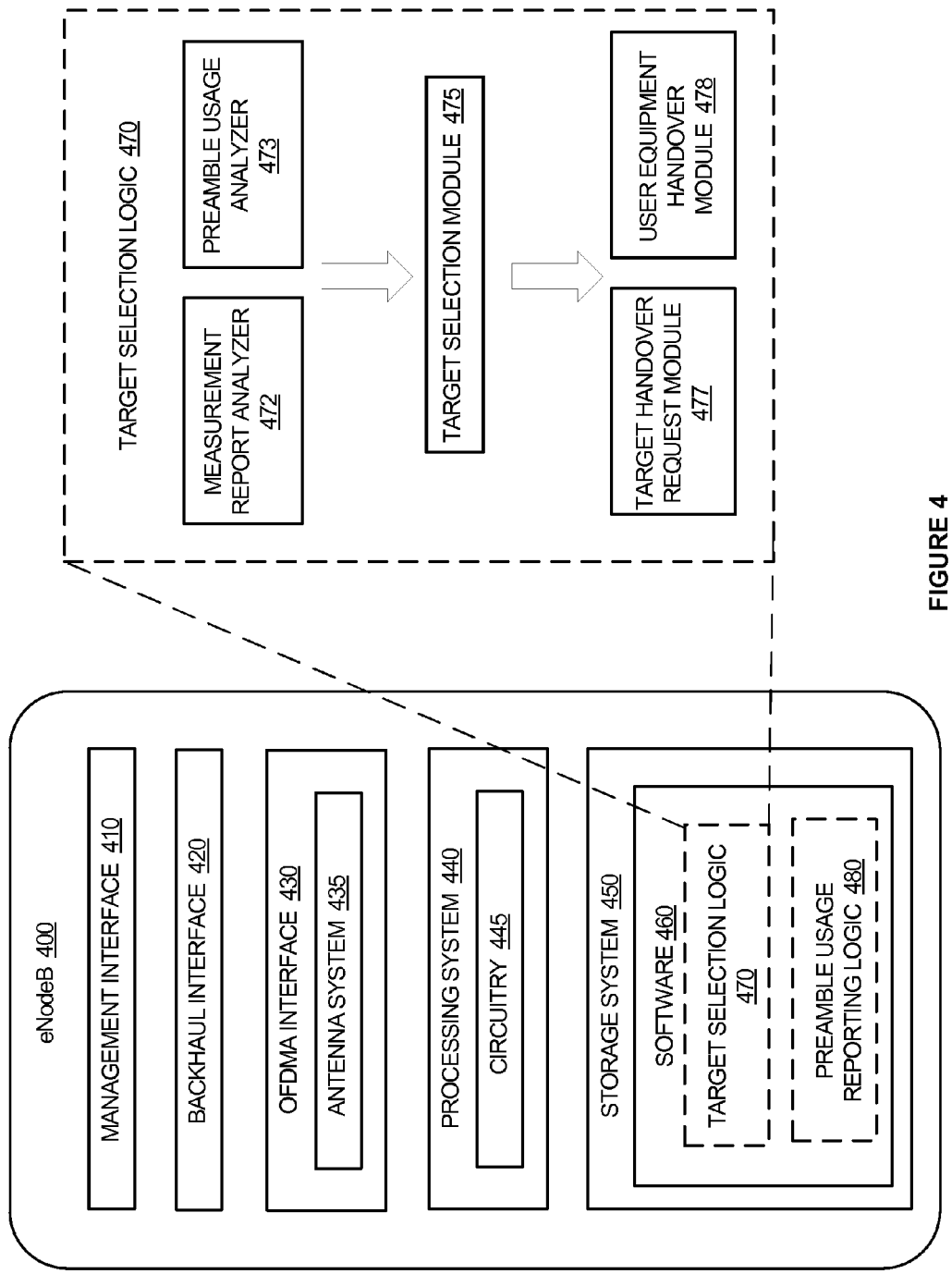
FIG. 4 illustrates an eNodeB that processes preamble usage data to select a handover target.

FIG. 4 illustrates eNodeB 400, which is an example internal configuration of eNodeBs 110, 120-121, 310, and 320-321, although those eNodeBs could use alternative configurations. ENodeB 400 performs as a source eNodeB, a neighbor eNodeB, or a target eNodeB when appropriate. ENodeB 400 comprises management interface 410, backhaul interface 420, OFDMA interface 430, and processing system 440. Processing system 440 is linked to management interface 410, backhaul interface 420, and OFDMA interface 430. Processing system 440 includes processing circuitry 445 which is connected to storage system 450 that stores operating software 460. ENodeB 400 may include other well-known components such as a power supply and enclosure that are not shown for clarity. ENodeB 400 may be an LTE eNodeB, a WiMax base station, a mobile broadband wireless access (MBWA) base station, a Flash-OFDM base station, an ultra mobile broadband (UMB) base station, or some other wireless OFDMA access point.

OFDMA interface 430 comprises RF communication circuitry and antenna system 435. The RF communication circuitry typically includes an amplifier, filter, RF modulator, and signal processing circuitry. OFDMA interface 430 may also include a memory device, software, processing circuitry, or some other communication device. ENodeB 400 connects to wireless service provider infrastructure via a backhaul link which may be wireless or cabled. ENodeB 400 communicates over the backhaul link through backhaul interface 420. Backhaul interface 420 has communication circuitry such as an amplifier, filter, signal modulator, and signal processing circuitry that is appropriate to the transmission medium that carries the backhaul link. Provisioning and supervisory functions, including remote control, are handled by management interface 410.

Processing circuitry 445 comprises microprocessor and other circuitry that retrieves and executes operating software 460 from storage system 450. Storage system 450 comprises a non-transitory storage medium, such as a disk drive, flash drive, data storage circuitry, or some other memory apparatus. Processing circuitry 445 is typically mounted on a circuit board that may also hold storage system 450 and portions of management interface 410, backhaul interface 420, and OFDMA interface 430. Operating software 460 comprises computer programs, firmware, or some other form of machine-readable processing instructions. Operating software 460 includes target selection logic 470, which is an implementation of the states and operations illustrated in FIG. 2 tailored according to desired features. Operating software 460 may also include an operating system, utilities, drivers, network interfaces, applications, or some other type of software. When executed by processing circuitry 445, operating software 460 directs processing system 440 to operate eNodeB 400 as described herein and in accordance with target selection logic 470.

The implementation of target selection logic 470 may be an aggregation of modules such as those shown in FIG. 5. Measurement report analyzer 472 obtains measurement reports and initiates handover preparation. Preamble usage analyzer 573 receives neighbor preamble usage data and transforms the data into a form suitable for target selection. Both measurement report analyzer 572 and preamble usage analyzer 573 inform target selection module 575 of data changes or status changes that are relevant to target selection. Target selection module 575 evaluates the information it receives and then selects the best neighbor as a handover target as described herein. Implementations of target selection logic 570 have flexibility as to how many logic modules are present and how responsibilities are distributed amongst the modules.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an Evolved Node B (eNodeB) to initiate a handover, the method comprising:
   receiving, by the eNodeB, preamble usage data for a set of neighboring eNodeBs, the preamble usage data transferred by corresponding eNodeBs of the set of neighboring eNodeBs over a backhaul link;
   selecting, by the eNodeB, a target eNodeB from the set of neighboring eNodeBs based on the preamble usage data;
   sending, by the eNodeB, a handover request for delivery to the target eNodeB.

2. The method of claim 1 further comprising:
   processing the preamble usage data to identify an eNodeB of the set of neighboring eNodeBs having a highest count of unallocated contention-free preambles, wherein the identified eNodeB is selected as the target eNodeB.

3. The method of claim 2, further comprising:
receiving a measurement report from a user equipment engaged in a voice over Long Term Evolution (VOLTE) session.

4. The method of claim 2, further comprising:
receiving a measurement report from a user equipment having an RRC connection.

5. The method of claim 1 further comprising:
receiving a measurement report from a user equipment engaged in a VOLTE session; and processing the preamble usage data to identify an eNodeB of the set of neighboring eNodeBs operating a longest time with at least one unallocated contention-free preamble, wherein the identified eNodeB is selected as the target eNodeB.

6. The method of claim 1 further comprising:
processing the preamble usage data to identify an eNodeB of the set of neighboring eNodeBs having a lowest count of detected random access preambles, wherein the identified eNodeB is selected as the target eNodeB.

7. The method of claim 1 further comprising:
processing the preamble usage data to identify an eNodeB of the set of neighboring eNodeBs having a lowest count of bit errors corrected by Hybrid automatic repeat request (HARQ) on the physical random access channel (PRACH), wherein the identified eNodeB is selected as the target eNodeB.

8. The method of claim 1 further comprising:
processing the preamble usage data to identify an eNodeB of the set of neighboring eNodeBs having a lowest count of HARQ nacks of PRACH, wherein the identified eNodeB is selected as the target eNodeB.

9. The method of claim 1 further comprising:
processing the preamble usage data to identify an eNodeB of the set of neighboring eNodeBs operating a longest time without detecting a random access preamble, wherein the identified eNodeB is selected as the target eNodeB.

10. The method of claim 1 further comprising:
processing the preamble usage data to identify an eNodeB of the set of neighboring eNodeBs having a highest count of PRACH opportunities without a detected preamble, wherein the identified eNodeB is selected as the target eNodeB.

11. An Evolved Node B (eNodeB) system comprising:
a backhaul interface including communication circuitry configured to communicate with neighboring eNodeBs over a backhaul link;
a processing system including processing circuitry communicatively coupled to the backhaul interface and configured to:
receive, via the backhaul interface, preamble usage data for a set of neighboring eNodeBs, the preamble usage data transferred by corresponding eNodeBs of the set of neighboring eNodeBs over the backhaul link;
process the preamble usage data to select a target eNodeB from the set of neighboring eNodeBs based on the preamble usage data, and
direct the backhaul interface to send a handover request for delivery to the target eNodeB.

12. The eNodeB system of claim 11 wherein to process the preamble usage data, the processing system is configured to: identify an eNodeB of the set of neighboring eNodeBs having a highest count of unallocated contention-free preambles.

13. The eNodeB system of claim 11 further comprising:
an OFDMA interface,
wherein the processing system is further configured to receive, from the OFDMA interface, a measurement report transferred by a user equipment engaged in a voice over Long Term Evolution (VOLTE) session, and
wherein to process the preamble usage data, the processing system is configured to identify an eNodeB of the set of neighboring eNodeBs having a highest count of unallocated contention-free preambles.

14. The eNodeB system of claim 11 further comprising:
an OFDMA interface,
wherein the processing system is further configured to receive, from the OFDMA interface, a measurement report transferred by a user equipment having an RRC connection, and
wherein to process the preamble usage data, the processing system is configured to identify an eNodeB of the set of neighboring eNodeBs having a highest count of unallocated contention-free preambles.

15. The eNodeB system of claim 11 further comprising:
an OFDMA interface,
wherein the processing system is further configured to receive, from the OFDMA interface, a measurement report transferred by a user equipment engaged in a VOLTE session, and
wherein to process the preamble usage data, the processing system is configured to identify an eNodeB of the set of neighboring eNodeBs operating a longest time with at least one unallocated contention-free preamble.

16. The eNodeB system of claim 11 wherein to process the preamble usage data, the processing system is configured to identify an eNodeB of the set of neighboring eNodeBs having a lowest count of detected random access preambles.

17. The eNodeB system of claim 11 wherein to process the preamble usage data, the processing system is configured to identify an eNodeB of the set of neighboring eNodeBs having a lowest count of bit errors corrected by Hybrid automatic repeat request (HARQ) on the physical random access channel (PRACH).

18. The eNodeB system of claim 11 wherein to process the preamble usage data, the processing system is configured to identify an eNodeB of the set of neighboring eNodeBs having a lowest count of HARQ nacks of PRACH.

19. The eNodeB system of claim 11 wherein to process the preamble usage data, the processing system is configured to identify an eNodeB of the set of neighboring eNodeBs operating a longest time without detecting a random access preamble.

20. The eNodeB system of claim 11 wherein to process the preamble usage data, the processing system is configured to identify an eNodeB of the set of neighboring eNodeBs having a highest count of PRACH opportunities without a detected preamble.

* * * * *